United States Patent
Kilcher et al.

(10) Patent No.: US 8,848,269 B2
(45) Date of Patent: Sep. 30, 2014

(54) METHOD FOR PROJECTING AN IMAGE

(71) Applicant: Lemoptix SA, Lausanne (CH)

(72) Inventors: Lucio Kilcher, Montreux (CH); Nicolas Abele, Lausanne (CH)

(73) Assignee: Lemoptix SA, Lausanne (CH)

( * ) Notice: Subject to any disclaimer, the term of this patent is extended or adjusted under 35 U.S.C. 154(b) by 0 days.

(21) Appl. No.: 13/892,971

(22) Filed: May 13, 2013

(65) Prior Publication Data

US 2013/0242364 A1 Sep. 19, 2013

Related U.S. Application Data

(63) Continuation of application No. PCT/EP2010/068609, filed on Dec. 1, 2010.

(51) Int. Cl.
G02B 26/08 (2006.01)
G02B 26/10 (2006.01)
G02B 26/12 (2006.01)
G02B 26/00 (2006.01)

(52) U.S. Cl.
CPC .......... G02B 26/101 (2013.01); G02B 26/0858 (2013.01); G02B 26/085 (2013.01); G02B 26/0866 (2013.01); G02B 26/0841 (2013.01)
USPC ........ 359/201.2; 359/290; 359/291; 359/292; 359/293; 359/294; 359/295

(58) Field of Classification Search
USPC ................ 359/199.3, 290–295, 201.2, 212.1; 358/474
See application file for complete search history.

(56) References Cited

U.S. PATENT DOCUMENTS

| 2005/0253055 A1 | 11/2005 | Sprague et al. |
| 2008/0043295 A1 | 2/2008 | Sakakibara |
| 2008/0123167 A1 * | 5/2008 | Weiss et al. .................... 359/198 |
| 2008/0204839 A1 | 8/2008 | Murakami et al. |
| 2008/0278785 A1 | 11/2008 | Klose et al. |
| 2009/0185251 A1 * | 7/2009 | Chen et al. ................. 359/199.3 |

FOREIGN PATENT DOCUMENTS

| WO | 2010021215 A1 | 2/2010 |
| WO | 2010107071 A1 | 9/2010 |

* cited by examiner

*Primary Examiner* — Scott J Sugarman
*Assistant Examiner* — Mustak Choudhury
(74) *Attorney, Agent, or Firm* — Tarolli, Sundheim, Covell & Tummino LLP

(57) ABSTRACT

According to the present invention there is provided a method of projecting an image, the method comprising the steps of, providing light signal which is configured such that it can be projected onto a display surface to display an image; oscillating a first reflective surface, to scan the light signal over the display surface, using an actuator which is in operable cooperation with the first reflective surface, by applying a first actuation signal to the first reflective surface, wherein a rise time or fall time of the first actuation signal is inversely proportional to a resonant frequency of oscillation of the first reflective surface.

16 Claims, 8 Drawing Sheets

METHOD FOR PROJECTING AN IMAGE

RELATED APPLICATION

This application is a Continuation of PCT/EP2010/068609, filed Dec. 1, 2010, the subject matter of which is incorporated herein by reference in its entirety.

FIELD OF THE INVENTION

The present invention relates to a method for projecting an image onto a display surface, in particular, but not exclusively, to method of projecting an image onto a display surface which involves oscillating one or more mirrors to scan projected light across a display surface, wherein the oscillation actuation signal shape of the one or more mirror is optimised to improve the quality of the image visible on the display surface.

BACKGROUND TO THE INVENTION

A MEMS micro-mirror device is a device that contains an optical MEMS (Micro-Electrical-Mechanical-System). The optical MEMS may comprise a cylindrical, rectangular or square micro-mirror that is adapted to move and to deflect light over time. The micro-mirror is usually connected by torsion arms to a fixed part and can tilt and oscillate along one or two axis. Different actuation principles can be used, including electrostatic, thermal, electro-magnetic or piezo-electric. MEMS micro-mirror devices are known in which the area of these micro-mirrors are around a few $mm^2$. In this case, the dimensions of the MEMS device, comprising the packaging, is around ten $mm^2$. This device is usually made of silicon, and can be encapsulated in a package that can include the driving actuation electronics. Various optical components, such as for example lenses, beam combiner, quarter-wave plates, beam splitter and laser chips, are assembled with the packaged MEMS to build a complete system such as, for example, a projection system.

A typical application of the MEMS micro-mirror devices is for projection systems. In a projection system, a 2-D image or a video can be displayed on a display surface; each pixel of the 2-D image or a video is generated by combining modulated red, green and blue laser light sources, by means of, for example, a beam combiner. The combined light from the modulated red, green and blue laser is emitted from the beam combiner as a beam of light. The beam of light emitted from the beam combiner comprises pulses, and each pulse will correspond to a pixel of the 2-D image or a video. A MEMS micro-mirror device directs the beam of light to a display surface and oscillates to scan the beam of light in a zig-zag or lissajou pattern across the display surface so that the 2-D image, or a video, is displayed on the display surface, pixel-by-pixel. The micro-mirror within the MEMS micro-mirror device will continuously scan light from left to right and from top to bottom so that each pixel of the 2-D image or a video is continuously refreshed. The speed of oscillation micro-mirror is such that a complete 2-D image or a video is visible on the display surface.

Typically, the micro-mirror of a MEMS micro-mirror device is able to oscillate along one axis. Therefore, in order to display a 2-D image on a display surface a projection system will require two MEMS micro-mirror devices; a first MEMS micro-mirror device is required to scan light along the horizontal and a second MEMS micro-mirror device is required to scan light along the vertical. The first and the second MEMS micro-mirror devices must be precisely positioned such that the oscillatory axes of their respective micro-mirrors are orthogonal.

During operation, the micro-mirror of the first MEMS micro-mirror device receives light from the beam combiner and deflects the light to the micro-mirror of the second MEMS micro-mirror device. The micro-mirror of the second MEMS micro-mirror device will in turn deflect the light to the display surface where it will appear as a pixel. The micro-mirror of the first MEMS micro-mirror device will oscillate to scan the light along the horizontal thereby displaying the first row of pixels on the display surface, pixel by pixel. When the first row of pixels have been projected onto the display surface, the micro-mirror of the second MEMS micro-mirror device will move about its oscillatory axis so that light received from the micro-mirror of the first MEMS micro-mirror device is directed towards the next row where pixels are to be displayed. The micro-mirror of the first MEMS micro-mirror device will then oscillate to scan the light from along the horizontal to display the next row of pixels. The process is continuous so that a complete image is visible on the display surface. Typically, the speed of oscillation of the micro-mirror in the second MEMS micro-mirror device will be much slower than the speed of oscillation of the micro-mirror in the first MEMS micro-mirror device. Accordingly, the micro mirror in the second MEMS micro-mirror device (i.e., the micro-mirror which is responsible for scanning the light along the vertical) is often referred to as the 'slow mirror' and the micro-mirror in the first MEMS micro-mirror device (i.e., the micro-mirror which is responsible for scanning the light along the horizontal) is often referred to as the 'fast mirror'.

It is also known to provide the fast and slow micro mirror within the same MEMS micro-mirror device. Advantageously, with such MEMS micro-mirror devices the micro-mirrors are pre-arranged during the manufacturing stage within the MEMS micro-mirror device such that their oscillatory axes are orthogonal. A further advantage is that a projection system will require only one such MEMS micro-mirror device to display a 2-D image on a display surface.

Other MEMS micro-mirror devices comprise a single 2-D micro-mirror which can oscillate along two orthogonal oscillation axes. During operation, the single 2-D micro-mirror receives modulated light from the beam combiner and deflects the light to a display surface where it will appear as a pixel. The single 2-D micro-mirror will oscillate along a first oscillation axis to scan the light along the horizontal thereby displaying the first row of pixels on the display surface. When the first row of pixels are have been projected onto the display surface, the single 2-D micro-mirror oscillates about a second oscillation axis (which is orthogonal to the first oscillation axis) so that light received from the beam combiner is directed towards the next row where pixels are to be displayed. The single 2-D micro-mirror will oscillate along the first oscillation axis to scan the light from the beam combiner along the horizontal thereby displaying the next row of pixels on the display surface. The process is continuous so that a complete image is visible on the display surface. It is also possible that the 2-D micro-mirror oscillates about both the first and second oscillation axis simultaneously. The advantage of using a single 2-D micro-mirror which can oscillate along two orthogonal oscillation axes, is that only a single micro-mirror is required to display a 2-D image on a display surface. Typically, the speed of oscillation of the single 2-D micro-mirror about the first oscillation axis is much greater than the speed of oscillation of the single 2-D micro-mirror about the second oscillation axis; accordingly, the first oscillation axis (i.e., the axis about which the single 2-D micro-mirror oscillates to scan light along the horizontal) is known as the "fast axis" and the second oscillation axis (i.e., the axis about which the single 2-D micro-mirror oscillates to scan light along the vertical) is known as the "slow axis".

The speed of oscillation of the micro-mirrors about their respective oscillation axes greatly impacts on the quality of the projected image visible on the display surface. For example, if the fast mirror is oscillated about its oscillation axis too quickly, then the spacing between consecutive pixels on the display surface will be too large and the projected image will appear dull on the display surface. Conversely, if the fast mirror is oscillated about its oscillation axis too slowly, then overlapping of consecutive pixels may occur on the display surface and the quality of the projected image visible on the display surface will be compromised.

Usually, the "fast mirror" oscillates at its mechanical resonant frequency of oscillation, or in the case of the single 2-D micro-mirror it usually oscillates at its mechanical resonant frequency of oscillation about the "fast axis". Therefore, the speed of oscillation of the "fast mirror", or single 2-D micro-mirror about the "fast axis", cannot be increased any further without compromising with other characteristics (power consumption, scanning angle). In contrast the speed of oscillation of the "slow mirror", and the speed of oscillation of the single 2-D micro-mirror about the "slow axis", can be increased and manipulated.

The speed of oscillation of the "slow mirror" is preferably such that as the fast mirror scans along a row the slow mirror oscillates very slowly such that the light is scanned in a zig-zag pattern across the display screen.

Figure 1:
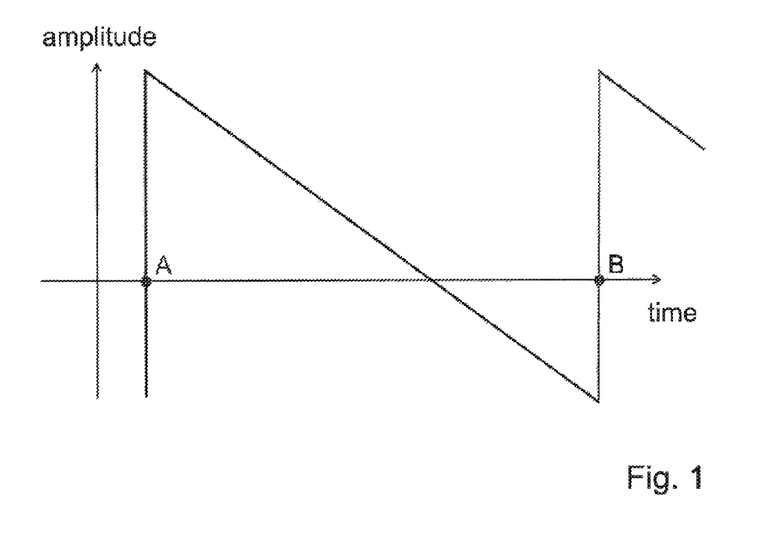
FIG. 1 is a graph which illustrates the ideal amplitude of oscillations of a slow mirror in a projector.

The fast mirror and slow mirror should continue to oscillate until each pixel of the 2-D image or video has been projected to the display surface. The process of scanning light from the projector over the display surface is continuously repeated and is carried out at a speed which will ensure that a complete image is visible on the display surface. Thus, once the light from the projector has been scanned over the display surface to display each of the pixels of the 2-D image or video, the light from the projector must again be projected towards the top of the image so that scanning process may begin once again so that the projected image can be "refreshed". To direct the light to the top of the image once more the slow mirror must oscillate so that it returns to its original position. Preferably, the slow mirror should oscillate instantaneously back to its original position. Thus, ideally the amplitude of oscillation of the slow mirror should have a saw-tooth profile as depicted in FIG. 1.

Figure 2:
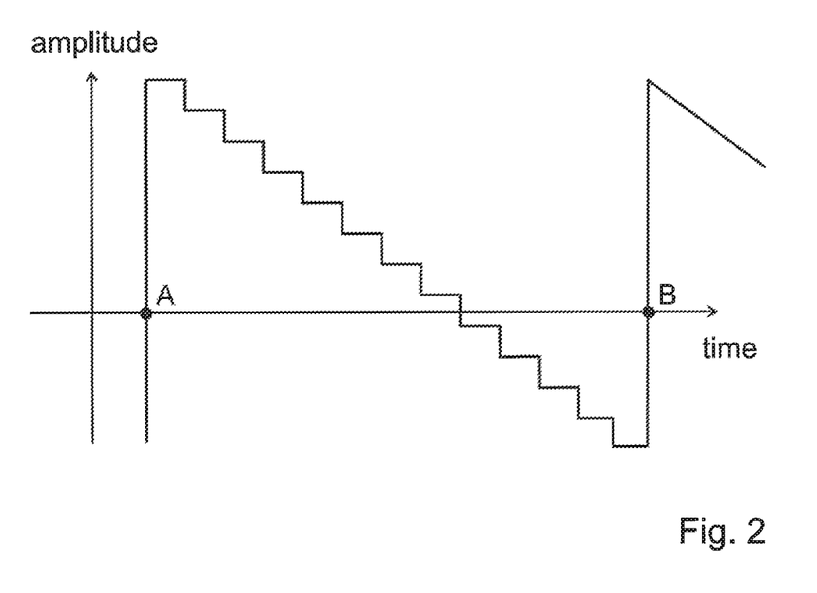
FIG. 2 is a graph which illustrates a movement for the slow mirror, wherein the slow mirror undergoes stepwise oscillation.

Between time points A and B the slow mirror oscillates slowly to scan the light vertically along the display surface. The combination of vertical scanning provided by the slow mirror and horizontal scanning provided by the fast mirror, means that light from the projector is scanned in a zig-zag pattern over the display surface. Alternatively, the slow mirror may be oscillated stepwise, as shown in FIG. 2; in this case each row of pixels will be projected along a horizontal line, row by row; the fast mirror oscillates to scan light along the horizontal to display a row of pixels; once a row of pixels have been projected the slow mirror will oscillate so that projected light is directed to the next row where pixels are to be displayed. The number of steps which the slow mirror undertakes will correspond to the number of rows which form the projected image; the number of steps is usually approximately between 240 and 1080.

Regardless of whether the slow mirror undergoes a constant slow oscillating movement or a stepwise oscillation, at point B each pixel of the 2-D image or video has been projected onto the display surface. Thus at B the slow mirror instantaneously oscillates back to its original position so that the scanning process can once again begin from the first pixel of the 2-D image so that the projected image can be "refreshed".

Figure 3:
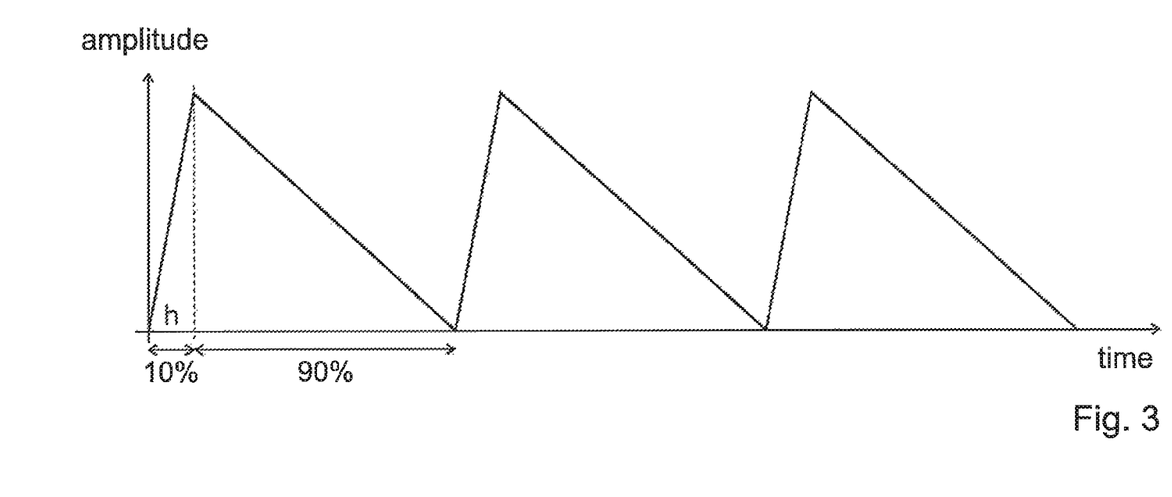
FIG. 3 is a graph which illustrates the actual amplitude of oscillations of the slow mirror in a projector.

However, in reality, due to the inertia and mass of the slow mirror, and friction, the actuator which oscillates the slow mirror cannot oscillate the slow mirror instantaneously back to its original position. Accordingly, the profile of the amplitude of oscillation of the slow mirror will have a rise/fall time 'h' as depicted in FIG. 3. Normally the amplitude of oscillation of the slow mirror will have a 10% rise time, or fall time, with respectively a 90% fall time, or rise time.

Figure 4:
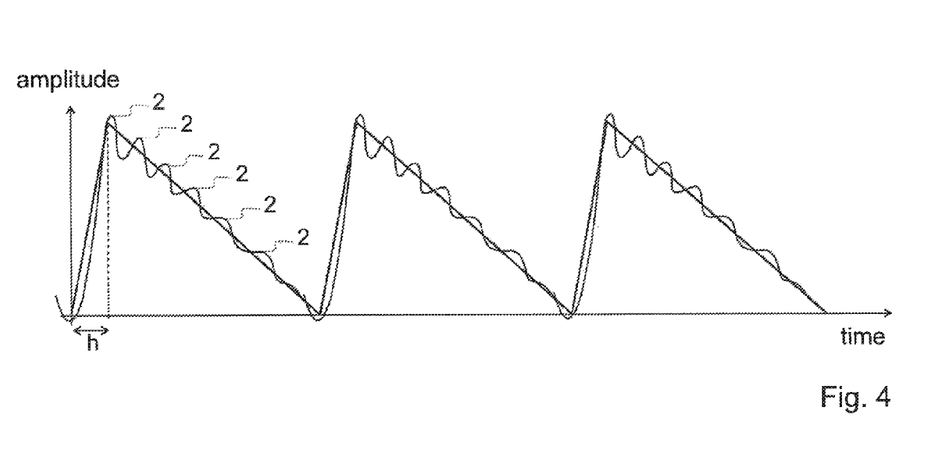
FIG. 4 illustrates stray oscillations on the slow mirror which can be caused by oscillating the slow mirror too quickly or too slowly.

As depicted in FIG. 4, if the rise time or fall time of actuating signal used to actuate oscillation of the slow mirror is too short or too long, then stray oscillations 2 may be imparted on the slow mirror. The stray oscillations can be due to rebound of the slow mirror for example. Furthermore, as the slow mirror is subject to a low air damping, a step response of the slow mirror will be subject to stray oscillations. Moreover, these stray oscillations will increase with decreasing air damping applied on a surface of the slow mirror.

Figure 5:
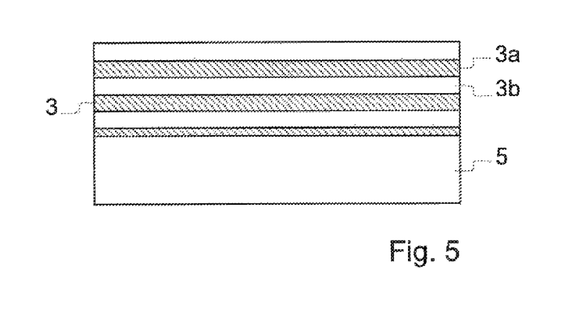
FIG. 5 illustrates how a projected image can be affected by the stray oscillations illustrated in FIG. 4.

As illustrated in FIG. 5, the stray oscillations 2 compromise the projected image 3 visible on the display surface 5 as parts of the projected image 3 will appear brighter than other parts. For example, FIG. 4 shows that part $3a$ of the projected image 3 is brighter than part $3b$ of the projected image 3.

The US patent application US2008204839 describes a system which uses a vertical scanning wave (W) (for each period) which includes a saw tooth wave (Wa) part followed by a corrective wave part (Wb). The scanning wave is applied to a reflective surface. Disadvantageously, the scanning wave requires a corrective part to suppress stray oscillations of the reflecting plate caused when the saw tooth wave instantly returning from the maximum level to the minimum level.

It is an aim of the present invention to obviate or mitigate one or more of the aforementioned disadvantages.

SUMMARY OF THE INVENTION

According to a first aspect of the present invention there is provided a method of projecting an image, the method comprising the steps of, providing a light signal which is configured such that it can be projected onto a display surface to display an image; and oscillating a first reflective surface, to scan the light signal over the display surface, using an actuator which is in operable co-operation with the first reflective surface, by applying a first actuation signal to the first reflective surface, wherein a rise time, or fall time, of the first actuation signal is inversely proportional to a resonant frequency of oscillation of the first reflective surface.

According to a further aspect of the present invention there is provided a method of projecting an image, the method comprising the steps of, providing a light signal which is configured such that it can be projected onto a display surface to display an image; oscillating a first reflective surface, to scan the light signal over the display surface, using an actuator which is in operable co-operation with the first reflective surface, by applying a first actuation signal to the first reflective surface, wherein a rise time of the first actuation signal is inversely proportional to a resonant frequency of oscillation of the first reflective surface.

According to a further aspect of the present invention there is provided a method of projecting an image, the method comprising the steps of, providing a light signal which is configured such that it can be projected onto a display surface to display an image; oscillating a first reflective surface, to scan the light signal over the display surface, using an actuator which is in operable co-operation with the first reflective surface, by applying a first actuation signal to the first reflective surface, wherein a fall time of the first actuation signal is inversely proportional to a resonant frequency of oscillation of the first reflective surface.

Providing a first actuation signal which has a rise time, or fall time, which is inversely proportional to the resonant frequency of oscillation of the first reflective surface, ensures that stray oscillations are not imparted on the first reflective surface. Furthermore, since no stray oscillations are imparted on the first reflective surface this obviates the need for a corrective signal to suppress stray oscillations.

The methods may comprise the step of, oscillating a second reflective surface about an oscillation axis, using a second actuation signal, so that the first and second reflective surfaces oscillate with an amplitudes of oscillation, to scan a light signal over the display surface, wherein the rise time or fall time of the first actuation signal is inversely proportional to a resonant frequency of oscillation of the first reflective surface. The second reflective surface may be oscillated by applying a second actuation signal to the second reflective surface, using a second actuator which is in operable communication with the second reflective surface.

The method may further comprise the step of filtering the first and/or second actuation signals. The method may further comprise the step of filtering the first actuation signal. The method may further comprise the step of filtering the first actuation signal used to effect oscillation of the first reflective surface, to remove one or more frequency components in said first actuation signal. The method may further comprise the step of filtering the first actuation signal used to effect oscillation of the first reflective surface, to remove any discontinuities in said first actuation signal. Preferably, the filtered frequency components are inside a frequency range window. The frequency range window may be defined by a user. The frequency range window may be centered at a resonant frequency of the reflective surface.

The method may further comprise the step of compensating for a change in the position of a peak in the actuation signal, caused by filtering.

The first and second reflective surfaces may be arranged such that they are in optical communication with one another. The first and second reflective surfaces may be arranged such that they are in optical communication with one another to direct light towards a display surface. The first reflective surface may oscillate about a first oscillation axis and the second reflective may oscillate about a second oscillation axis, to scan light over the display surface. The first oscillation axis may be orthogonal to the second oscillation axis.

The first reflective surface may be configured to scan light along the vertical reference. The second reflective surface may be configured to scan light along the horizontal reference. The first reflective surface may oscillate to scan light along the vertical reference. The second reflective surface may oscillate to scan light along the horizontal reference. Alternatively, the first reflective surface may be configured to scan light along the horizontal reference. The second reflective surface may be configured to scan light along the vertical reference. The first reflective surface may oscillate to scan light along the horizontal reference. The second reflective surface may oscillate to scan light along the vertical reference.

The first or second reflective surface may be oscillated faster than the other reflective surface. The second reflective surface may oscillate faster than the first reflective surface. Thus, the second reflective surface may be a fast reflective surface and the first reflective surface may be a slow reflective surface.

The rise time or fall time may be an integer factor of $1/F_{resonant}$. The rise time or fall time may be equal to:

$$\{1F_{resonant}\} \times N$$

wherein $F_{resonant}$ is the resonant frequency of oscillation of the first reflective surface and N is a chosen constant.

The rise time or fall time may be equal to:

$$\{1/F_{resonant} \pm f)\} \times N$$

wherein, $F_{resonant}$ is the resonant frequency of oscillation of the first reflective surface, N is a chosen constant, and f is a variable which is to account for the effects of filtering of the first actuation signal.

Preferably $F_{resonant}$ is in the range 1-5000 Hz. More preferably $F_{resonant}$ is in the range 100-2000 Hz. Most preferably $F_{resonant}$ is in the range 300-1000 Hz.

Preferably N is in the range 1-1000. More preferably N is in the range 1-200. Most preferably N is in the range 1-150. The parameter N is chosen according to the targeted mirror response.

Preferably f is in the range 0-500 Hz. More preferably f is in the range 1-400 Hz. Most preferably f is in the range 1-250 Hz. The parameter f is linked to the filtering which is empirically optimized according to the dynamic behaviour of the reflective surface.

The or each reflective surface may be a mirror. Preferably, the or each reflective surface is a MEMS micro-mirror.

BRIEF DESCRIPTION OF THE DRAWINGS

An embodiment of the invention will now be described by way of example only, with reference to the accompanying drawings in which.

DETAILED DESCRIPTION OF THE DRAWINGS

FIGS. 1-5 have been described in the background of the invention section.

Figure 6:
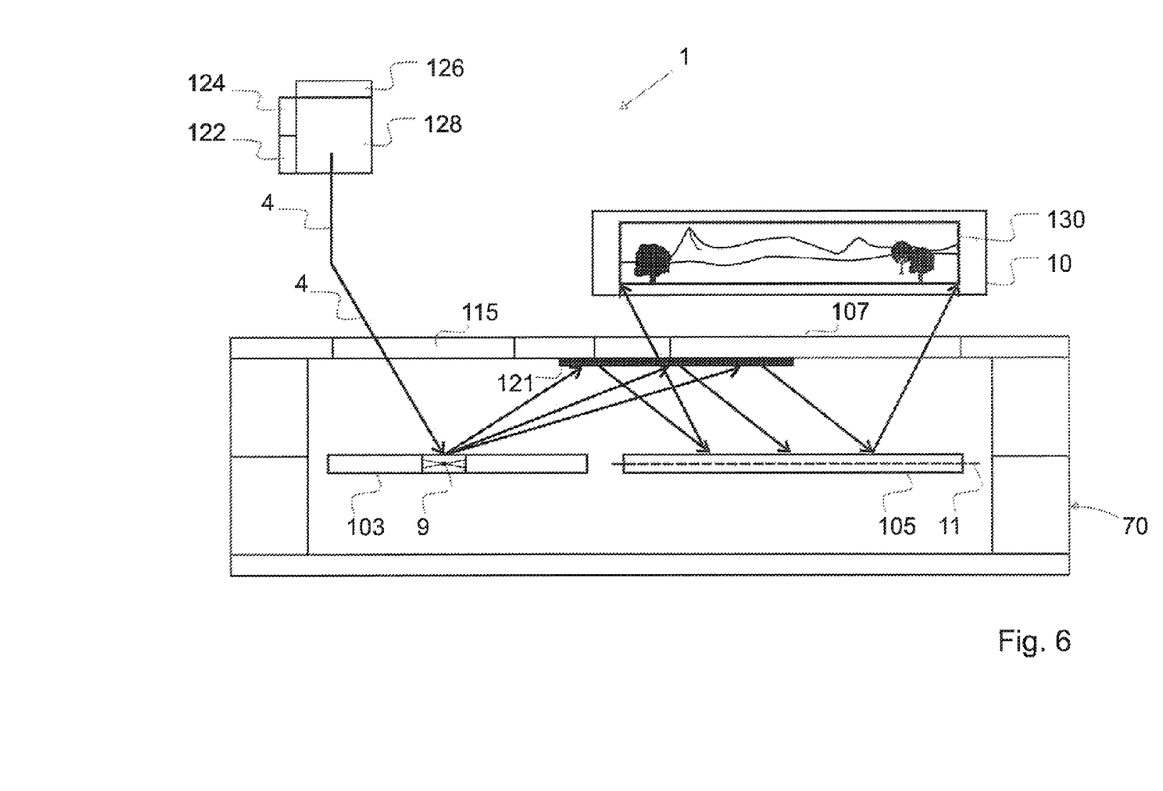
FIG. 6 provides a cross-section view of a projection device which uses a fast and slow MEMS micro-mirror to project an image onto a display surface.

FIG. 6 provides a cross-section view of a projection device 1. The projection device 1 projects a 2-D image 130, so that it is displayed on a display surface 10. Each individual pixel (not shown) of the 2-D image 130 is generated by combining modulated red 124, green 126 and blue 122 laser light sources, by means of a beam combiner 128. The combined modulated red 124, green 126 and blue 122 laser light is emitted from the beam combiner 128 as a pulsed light beam 4. Each pulse of the pulsed light beam 4 corresponds to a pixel of the 2-D image 130. The pulsed light beam 4 is directed towards a MEMS micro-mirror device 70. The MEMS micro-mirror device 70 in turn directs this pulsed light beam 4 to the display surface 10 where the 2-D image 130, is displayed, pixel-by-pixel.

The MEMS micro-mirror device 70 comprises a first MEMS micro-mirror 103 and a second MEMS micro-mirror 105. The first MEMS micro-mirror 103 oscillates about a first oscillation axis 9 to scan light along the horizontal and the second MEMS micro-mirror 105 oscillates about a second oscillation axis 11 to scan light along the vertical. The first MEMS micro-mirror 103 oscillates faster than the second MEMS micro-mirror 105, accordingly the first MEMS micro-mirror 103 is considered the fast mirror and the second MEMS micro-mirror 105 is considered the slow mirror. The first MEMS micro-mirror 103 will be referred to hereafter as the 'fast mirror' 103 and the second MEMS micro-mirror 105 will be referred to hereafter as the 'slow mirror' 105. A first actuator (not shown) is in operable co-operation with the slow mirror 105 and is used to oscillate the slow mirror 105; and a second actuator (not shown) is in operable co-operation with the fast mirror 103 and is used to oscillate the fast mirror 103.

The slow mirror 105 and fast mirror 103 are arranged within the MEMS micro mirror device 70 such that the first oscillation axis 9 is orthogonal to the second oscillation axis 11.

During operation, the fast mirror 103 receives the pulsed light beam 4 from the beam combiner 128, through a first window 115 of the MEMS micro-mirror device 70, and deflects the pulsed light beam 4 to a reflective surface 121 within the MEMS micro-mirror device 70. The reflective surface 121 in turn deflects the pulsed light beam 4 to the slow mirror 105. The slow mirror 105 will in turn deflect the pulsed light beam 4, through a second window 107 of the MEMS micro-mirror device 70, to the display surface 10, where each pulse in the pulsed light beam 4 will appear as a pixel on the display surface 10.

The fast mirror 103 within the MEMS micro-mirror device 70 will oscillate about the first oscillation axis 9 to scan the pulsed light beam 4 along the horizontal. As the fast mirror 103 oscillates the slow mirror 105 will also oscillate slowly to scan the pulsed light beam 4 along the vertical. The combined effect of the oscillation of both the fast and slow mirrors 103, 105 is that pulsed light beam 4 will be scanned in a zig-zag pattern across the display surface 10, thereby displaying the 2-D image 130 on the display surface 10 pixel by pixel.

When all of the pixels of the 2-D image 130 have been displayed, it is necessary for the light to be scanned over the display surface 10 again to refresh the 2-D image 130. To refresh the 2-D image 130 the light must, once again, be directed toward the start of the image (i.e., a point on the display surface 10 where the very first pixel of the 2-D image 130 is to be displayed) so scanning can begin form the start of the 2-D image 130 and the whole 2-D image 130 can be refreshed. The slow mirror 105 is oscillated about the second oscillation axis 11, back to its original position, so that the pulsed light beam 4 is directed once more towards a point on the display surface 10 where the very first pixel of the 2-D image 130 is to be displayed. The fast mirror 103 and slow mirror 105 will again oscillate about their oscillation axis 9, 11 to scan the pulsed light beam 4 in a zig-zag pattern across the display screen 10, thereby refreshing the 2-D image 130. The process of scanning and refreshing of the 2-D image 130 is continuous and is carried out at a speed which will ensure that a complete 2D image 130 is visible to the viewer on the display surface 10.

A first actuator (not shown) is in operable communication with the slow mirror 105 and a second actuator (not shown) is in operable co-operation with the fast mirror 103. The actuators may take any suitable form, for example the actuators may be a piezoelectric, magnetic, electrostatic, thermal, or electro-magnetic actuator. The first actuator (not shown) cooperates with the slow mirror 105 and is used to oscillate the slow mirror 105; during operation a first actuation signal is applied by the first actuator to the slow mirror 105 to oscillate the slow mirror 105. The rise time (or fall time) of the first actuation signal is inversely proportional to a resonant frequency of oscillation of the slow mirror 105. A second actuator (not shown) is in cooperation with the fast mirror 103 and is used to oscillate the fast mirror 103; during operation a second actuation signal is applied by the second actuator to the fast mirror 103 to oscillate the fast mirror 103. The second actuation signal is configured to oscillate the fast mirror 103 at a frequency of oscillation which is equal to a resonant frequency of the fast mirror 103.

As discussed in the background section, in particular with reference to FIG. 4, if the rise time (or fall time) of the actuation signal which actuates the slow mirror 105 is too short or too long, then stray oscillations may be imparted on the slow mirror 105. Accordingly, when refreshing the projected 2-D image 130, there is a danger that stray oscillations could be imparted on the slow mirror 105 when oscillating the slow mirror 105 back towards the start of the 2-D image 130.

To prevent stray oscillations being imparted on the slow mirror 105, the first actuation signal applied to the slow mirror 105 is configured to have a rise time 'h' (or fall time) which is inversely proportional to the resonant frequency of oscillation of the slow mirror 105. Providing such an actuation signal ensures that the first actuator oscillates the slow mirror 105 at an optimal speed of oscillation which will prevent stray oscillations being imparted on the slow mirror 105. The first actuation signal has a rise time (or fall time) 'h' which is equal to:

$$\{1/F_{resonant}\} \times N$$

wherein $F_{resonant}$ is the resonant frequency of oscillation of the slow mirror 105 and N is a chosen constant. The parameter N is chosen empirically, and according to the targeted slow mirror oscillation; for example N may be equal to 1 or 2.

Figure 7:
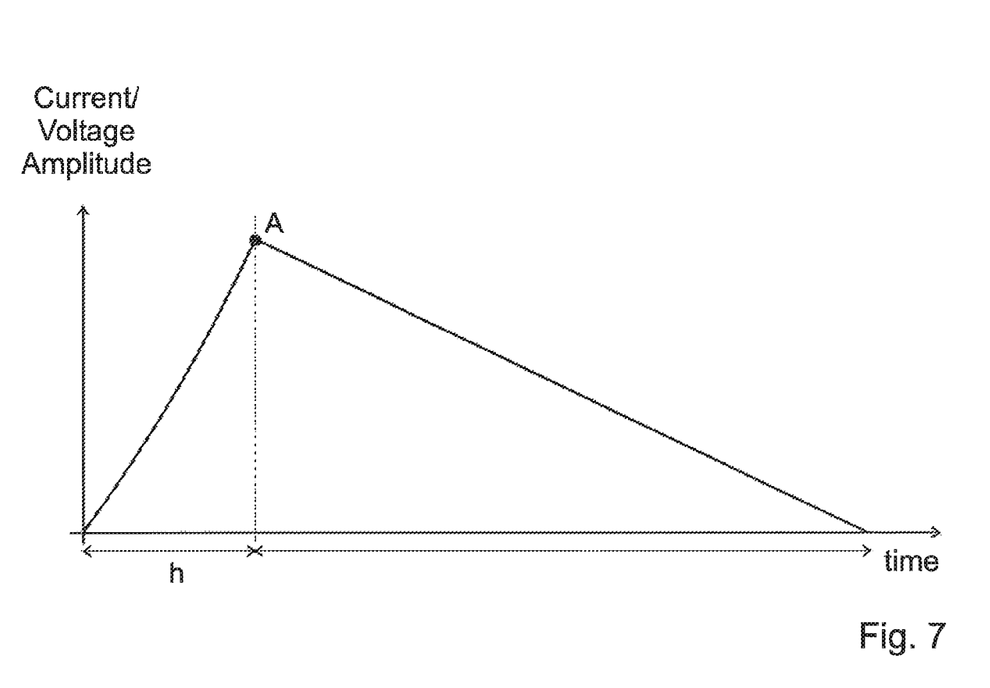
FIG. 7 illustrates an actuation signal, applied to the slow MEMS micro-mirror in the projection device of FIG. 6, to oscillate it.

FIG. 7 illustrates the first actuation signal, applied by the first actuator to the slow mirror 105, in the projection device of FIG. 6, to oscillate it. The first actuation signal may be a current signal or a voltage signal. FIG. 7 graphically illustrates that the rise time (or fall time) of the first actuation signal 'h' which is equal to:

$$\{1/F_{resonant}\} \times N.$$

In the particular first actuation signal illustrated in FIG. 7, $F_{resonant}$ is 750 Hz, however it will be understood that $F_{resonant}$ could be any frequency in the range 1-5000 Hz. In this particular example N is equal to 200, however it will be understood that N could be any integer in the range 1-1000. Thus, in order to oscillate the slow mirror 105 at an optimum speed which will ensure that no stray oscillations are imparted on the slow mirror 105, the first actuation signal which is applied to the slow mirror 105 should have a rise time 'h' equal to:

$$\{1/750\} \times 200 = 0.266 \text{ sec}$$

Ensuring that the the rise time of the first actuation signal, is inversely proportional to the resonant frequency of oscillation of the slow mirror 105, ensures that stray oscillations (as shown in FIG. 4) are not imparted on the slow mirror 105.

As is evident from FIG. 7 the first actuation signal which is applied to the slow mirror 105 to oscillate it, comprises a discontinuity at point "A". This discontinuity has the potential to impart stray oscillations on the slow mirror 105. Therefore, to achieve optimum oscillation of the slow mirror 105 the discontinuity at point 'A' should be removed before being applied to the slow mirror 105.

To remove the discontinuity at point "A" a filtering signal is applied to the first actuation signal. The filtering signal is graphically illustrated in FIG. 8; the filer which provides this filtering signal is a cutband filter which is centered at a resonant frequency of the slow mirror 105 ($F_{resonant}$). Upon application to the first actuation signal, the filtering signal smoothes the actuation signal at point 'A' so that the discontinuity is removed.

Figure 8:
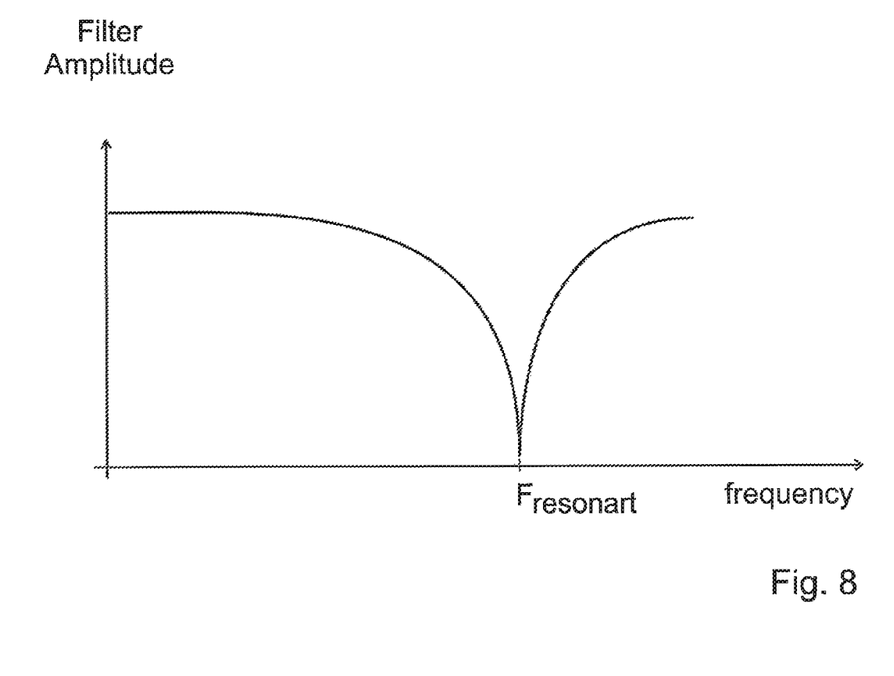
FIG. 8 illustrates a filter signal which can be applied to filter the actuation signal shown in FIG. 7.
Figure 9:
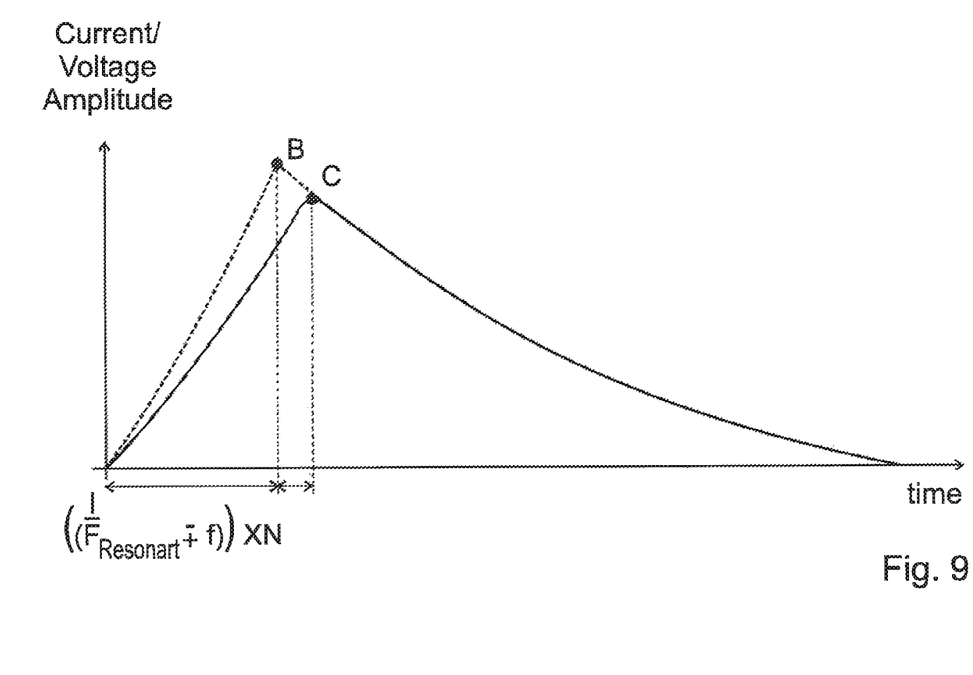
FIG. 9 illustrates the actuation signal of FIG. 7 after it has been filtered by the filter signal of FIG. 8 and represents the actual signal applied to the slow MEMS micro-mirror to oscillate it.

FIG. 9 illustrates the first actuation signal of FIG. 7 after it has been filtered by the filter signal of FIG. 8. As is evident from FIG. 9, the discontinuity at point "A" has been removed but the peak B of the first actuation signal has been moved to position C as a result of filtering. To account for the movement in the peak B the rise time (or fall time) of the first actuation signal is further adjusted by adding (or subtracting) a variable f to the $F_{resonant}$ variable so that the rise time (or fall time) of first actuation signal which is actually applied to the slow mirror 105 is proportional to:

$$\{1/(F_{resonant} \pm f)\} \times N$$

Normally, f is in the range 0-500 Hz. More preferably, f is in the range 1-400 Hz. Most preferably, f is in the range 1-250 Hz. f can also be used when determining a suitable actuation signal for a group, or batch, of slow mirrors 105 so as to account for variation in the resonant frequency of the slow mirrors 105 within the group or batch.

Various modifications and variations to the described embodiments of the invention will be apparent to those skilled in the art without departing from the scope of the invention as defined in the appended claims. Although the invention has been described in connection with specific preferred embodiments, it should be understood that the invention as claimed should not be unduly limited to such specific embodiment.

The invention claimed is:

1. A method of projecting an image, the method comprising the steps of,
providing light signal which is configured such that it can be projected onto a display surface to display an image;
oscillating a first reflective surface, on a MEMS micro mirror to scan the light signal over the display surface, using an actuator which is in operable co-operation with the first reflective surface on the MEMS micro mirror, by applying a first actuation signal to the actuator, wherein a rise time or fall time of the first actuation signal in a time-domain representation is inversely proportional to a resonant frequency of oscillation of the first reflective surface.

2. The method according to claim 1, comprising the step of, oscillating a second reflective surface using a second actuation signal, so that the first and second reflective surfaces oscillate with an amplitudes of oscillation, to scan a light signal over the display surface.

3. The method according to claim 2, wherein the second reflective surface is oscillated at a frequency which is the resonant frequency of the second reflective surface.

4. The method according to claim 1, further comprising the step of filtering the first actuation signal.

5. The method according to claim 4, further comprising the step of compensating for a change in the position of a peak in the first actuation signal, caused by filtering.

6. The method according to claim 2, wherein, the first and second reflective surfaces are arranged such that they are in optical communication with one another.

7. The method according to claim 2, wherein, the first reflective surface is oscillated slower than the second reflective surface.

8. The method according to claim 1, wherein, the first reflective surface is configured to scan light along the horizontal reference.

9. The method according to claim 1, wherein, the first reflective surface is configured to scan light along the vertical reference.

10. The method according to claim 1, wherein, the each reflective surface is a mirror.

11. The method according to claim 1, wherein, the rise time, or fall time, is an integer factor of 1/Fresonant, wherein Fresonant is the resonant frequency of oscillation of the first reflective surface.

12. The method according to claim 1, wherein, the rise time or fall time is equal to $1/\{(Fresonant \pm f) \times N\}$ wherein, Fresonant is the resonant frequency of oscillation of the first reflective surface, N is a chosen constant and f is a variable which compensates for the effects of filtering of the actuation signal and/or compensates for variation in resonant frequency within a batch of first reflective surfaces.

13. The method according to claim 11, wherein, Fresonant is in the range 1-5000 Hz.

14. The method according to claim 12, wherein, N is in the range 1-1000.

15. The method according to claim 12, wherein, f is in the range 0-500 Hz.

16. A method of projecting an image, the method comprising the steps of,
providing light signal which is configured such that it can be projected onto a display surface to display an image;
oscillating a first reflective surface, to scan the light signal over the display surface, using an actuator which is in operable co-operation with the first reflective surface, by applying a first actuation signal to the actuator, wherein a rise time or fall time of the first actuation signal is inversely proportional to a resonant frequency of oscillation of the first reflective surface;
wherein, the rise time or fall time is equal to $1/\{(F_{resonant} \pm f) \times N\}$ wherein, $F_{resonant}$ is the resonant frequency of oscillation of the first reflective surface, N is a chosen constant and f is a variable which compensates for the effects of filtering of the actuation signal and/or compensates for variation in resonant frequency within a batch of first reflective surfaces.

* * * * *